Patented Sept. 11, 1945

2,384,546

UNITED STATES PATENT OFFICE 2,384,546

PREPARATION OF SYNTHETIC RUBBER

Charles F. Fryling, Akron, Ohio, assignor to The B. F. Goodrich Company, New York, N. Y., a corporation of New York No Drawing. Application September 27, 1941, Serial No. 412,680

12 Claims. (Cl. 260—84.5)

This invention relates to the preparation of synthetic rubber and particularly to the preparation of rubber-like materials by the emulsion polymerization of a mixture containing at least two butadiene-1,3 hydrocarbons, one of which is 2,3-dimethyl butadiene-1,3, and an alpha methylene nitrile.

Copolymers of butadiene-1,3 hydrocarbons such as butadiene-1,3 and isoprene, with alpha methylene nitriles such as acrylonitrile and methacrylonitrile are well known and because they possess, in addition to the essential properties of natural rubber such as elasticity and vulcanizability with sulfur, other properties in which natural rubber is deficient such as resistance to oils, to oxidation and to aging, have been widely used as replacements for natural rubber in many applications. Such copolymers, however, are notoriously difficult to process, one of the most troublesome processing difficulties being due to the fact that such materials become dry and tend to crumble when worked on a hot mill. Accordingly, it is necessary to carry out the milling operation on a relatively cold mill, to provide some means for dissipating the heat produced during milling and for maintaining a low temperature throughout the operation, and to employ much smaller batches of material than are ordinarily used with natural rubber, all of which expedients are highly undesirable from the standpoint of maximum processing efficiency, economy and speed.

I have now discovered that rubber-like copolymers made by the polymerization in aqueous emulsion of a mixture containing three or more components including at least two butadiene-1,3 hydrocarbons, one of which is 2,3-dimethyl butadiene-1,3, and an alpha methylene nitrile, in contrast to the above described two component copolymers, are easily processed and may readily be masticated on a hot mill. In addition such materials possess other desirable properties, such as high tensile strength and elongation, excellent oil resistance, abrasion resistance, heat resistance and resistance to aging, which are equal to and in some cases better than those of the two component copolymers.

In order to obtain these desirable copolymers it is necessary that the monomers polymerized be present in certain rather definite proportions. Thus the monomeric mixture must contain at least 50% by weight of two or more butadiene-1,3 hydrocarbons, one of which present in at least 10% by weight is 2,3-dimethyl butadiene-1,3, and at least 15% by weight of an alpha methylene nitrile. It is desirable that the mixture contain no polymerizable materials other than butadiene-1,3 hydrocarbons and alpha methylene nitriles but, if these materials are present in the above specified proportions, other materials copolymerizable with butadiene-1,3 hydrocarbons such as styrene, methyl acrylate, methyl methacrylate, vinylidene chloride and the like may also be present. The term "butadiene-1,3 hydrocarbons" is used herein to designate butadiene-1,3 (or ordinary butadiene) and its homologs which enter into polymerization reactions in substantially the same manner such as isoprene, 2,3-dimethyl butadiene-1,3 and piperylene, while the term "alpha methylene nitriles" is used to designate nitriles containing a methylene group ($CH_2=$) attached to a carbon atom adjacent to a nitrile group ($—C≡N$), such as acrylonitrile, alpha-methacrylonitrile, alpha-ethacrylonitrile, alpha-isopropacrylonitrile, alpha-methoxy-methacrylonitrile, alpha-chloro-ethacrylonitrile, etc.

The preferred synthetic rubbers of this invention are those prepared by the emulsion polymerization of a mixture of monomers consisting solely of butadiene-1,3, 2,3-dimethyl butadiene-1,3 and acrylonitrile, the proportion of 2,3-dimethyl butadiene being at least 10% by weight, the combined proportion of butadiene-1,3 and 2,3-dimethyl butadiene-1,3 being at least 50% by weight and the proportion of acrylonitrile being from 25 to 45% by weight. Moreover, it is preferable that there be a larger proportion of butadiene-1,3 than of 2,3-dimethyl butadiene-1,3 present in the mixture. For example, mixtures containing from 10 to 40% by weight of 2,3-dimethyl butadiene-1,3, from 35 to 65% by weight of butadiene-1,3 and about 25% by weight of acrylonitrile or mixtures containing from 10 to 25% by weight of 2,3-dimethyl butadiene-1,3, from 30 to 45% by weight of butadiene-1,3 and about 45% by weight of acrylonitrile yield excellent synthetic rubbers.

In the practice of this invention the polymerization of these monomeric mixtures to form synthetic rubber is carried out in aqueous emulsion. In this procedure the mixture of monomers is emulsified in water by the use of a suitable emulsifying agent. A polymerization initiator to start the polymerization reaction, a polymerization accelerator or catalyst to speed up the reaction and a polymerization modifier to improve the quality of the product are preferably added and the emulsion is allowed to polymerize by continuously agitating the same at a temperature of about 20–60° C. for a time sufficient to complete the reaction, about 10 to 100 hours usually being required. The polymerization product which is obtained in form of an aqueous dispersion resembling natural rubber latex is then stabilized by the addition of an age resistor or antioxidant and is coagulated by the same methods used to coagulate natural rubber latex, for example, by addition of acid, alcohol or salts or by a combination of these methods. Washing and drying of the coagulum produces a crude synthetic rubber which may be milled and otherwise processed in the same manner as natural rubber.

The preferred emulsifying agent for use in the above process consists of a water soluble soap derived from a fatty acid containing between 10 and 20 carbon atoms per molecule, such soaps as the sodium or potassium salts of lauric, myristic, palmitic, oleic or stearic acids being quite suitable. It is in general desirable to employ an emulsifying solution containing some free fatty acid, that is an aqueous solution containing a fatty acid which has been 70 to 90% neutralized with alkali, but it is also possible to employ completely neutralized soaps or even solutions of soaps, containing free alkali. Moreover emulsifying agents which produce emulsions having an acid reaction such as salts of organic bases containing long carbon chains, for example, the hydrochloride of diethylaminoethyloleylamine, trimethylcetylammonium methyl sulfate and the hydrochloride of the diethylaminoethoxyanilide of oleic acid, as well as other emulsifying agents which may be used under alkaline, acid or neutral conditions such as sodium lauryl sulfate and sodium isobutyl naphthalene sulfonate, may also be employed.

Polymerization initiators which may be used in the emulsion polymerization process include peroxides such as hydrogen peroxide and benzoyl peroxide, per-salts such as ammonium persulfate, sodium perborate, potassium persulfate, potassium percarbonate and the like and other types of initiators such as diazoaminobenzene, dipotassium diazomethane disulfonate and triphenyl-methylazobenzene. The preferred polymerization catalysts or accelerators are those which contain a small amount of a heavy metal compound which is added to the emulsion either in the form of a simple ionizable heavy metal salt such as ferrous sulfate, cobalt chloride, nickel nitrate or the like, as disclosed in the copending application of William D. Stewart, Serial No. 379,712, filed Feb. 14, 1941, or in the form of a redox system comprising a heavy metal in complex combination or otherwise associated with some other material such as sodium pyrophosphates, levulinic acid, glycine, cystine, beta-mercaptoethanol, quebrachitol or cholesterol, as disclosed in the copending applications of William D. Stewart, Serial Nos. 379,713, to 379,717 filed Feb. 14, 1941. Polymerization modifiers which, as mentioned above, are also preferably present during the polymerization are usually sulfur containing organic compounds such as the dialkyl dixanthogens, the higher tetralkyl thiuram mono-, di-, and polysulfides, the 2-mercaptoalkylthiazoles and bis-alkyl thiazyl-2 disulfides.

Other polymerization initiators, catalysts, accelerators and modifiers in addition to those listed above as well as other substances variously known as polymerization regulators, promoters, etc. which enable the polymerization to be carried out in a shorter time and at a lower temperature and/or which in some manner improve the quality of the products obtained may also be included in the emulsion to be polymerized. All of these added substances, however, are mentioned herein only to indicate that the best results are obtained when one or more of them are present, and it is not to be inferred that the monomer mixtures may not be polymerized in their absence. The broad scope of the invention, accordingly, contemplates any polymerization in aqueous emulsion of the monomeric mixtures of this invention regardless of whether or not such added substances are employed.

In order to illustrate the preparation of the improved synthetic rubbers of this invention, mixtures of butadiene-1,3, 2,3-dimethyl butadiene-1,3 and acrylonitrile were made up as follows:

| | Percent by weight | | | | | |
|---|---|---|---|---|---|---|
| | I | II | III | IV | V | VI |
| Butadiene-1,3 | 60 | 55 | 50 | 45 | 33 | 45 |
| 2,3-dimethyl butadiene-1,3 | 15 | 20 | 25 | 30 | 22 | 15 |
| Acrylonitrile | 25 | 25 | 25 | 25 | 45 | 40 |

A 10 gram sample of each of these monomeric mixtures was then emulsified with 25 cc. of a 2% aqueous solution of myristic acid which had been 85% neutralized with sodium hydroxide. Also included in each of the emulsions were 0.035 grams of hydrogen peroxide as a polymerization initiator and 0.03 g. of diisopropyl dixanthogen as a polymerization modifier. The emulsions were then sealed in glass containers and agitated at a constant temperature of 30° C. for about 60 hours whereupon latex-like dispersions were obtained, each of which when stabilized and coagulated yielded from 9.5 to 10.0 grams of a rubber-like three component copolymer of butadiene, dimethyl butadiene and acrylonitrile. All of these copolymers were coherent and plastic and when sheeted out on a two roll mixing mill it was observed that they could be milled readily at temperatures much higher than 150° F. without becoming dry and crumbling from the rollers. Two component polymers prepared in identically the same manner from 75 parts by weight of butadiene and 25 parts by weight of acrylonitrile or 55 parts by weight of butadiene and 45 parts by weight of acrylonitrile, however, cannot be milled satisfactorily at temperatures above about 140–150° F. When the above three component polymers were mixed with compounding ingredients in a typical tire tread recipe and vulcanized, they exhibited tensile strengths varying from 4500 to 5500 lbs./in.$^2$ and elongations of over 600%. The vulcanizates were also remarkably oil resistant, heat resistant and abrasion resistant.

It is to be understood that the above specific embodiments of this invention have been cited for illustrative purposes only and that it is not intended that the invention be limited solely thereto, for many modifications in accordance with the broad disclosure will be apparent to those skilled in the art and are within the spirit and scope of the appended claims.

I claim:

1. The process which comprises polymerizing in the form of an aqueous emulsion a mixture containing at least 50% by weight of two different butadiene-1,3 hydrocarbons, one of which is 2,3-dimethyl butadiene-1,3 present in at least 10% by weight, and at least 15% by weight of a nitrile of an alpha-methylene monocarboxylic acid.

2. The process which comprises polymerizing in the form of an aqueous emulsion a mixture containing butadiene-1,3, 2,3-dimethyl butadiene-1,3 and acrylonitrile, the proportion of 2,3-dimethyl butadiene-1,3 being at least 10% by weight, the combined proportion of butadiene-1,3 and 2,3-dimethyl butadiene-1,3 being at least 50% by weight and the proportion of acrylonitrile being from 25 to 45% by weight.

3. The process which comprises polymerizing in the form of an aqueous emulsion a mixture containing butadiene-1,3, 2,3-dimethyl butadiene-1,3 and acrylonitrile, the proportion of 2,3-dimethyl butadiene-1,3 being at least 10% by weight, the combined proportion of butadiene-1,3 and 2,3-dimethyl butadiene-1,3 being at least 50% by weight, the proportion by weight of butadiene-1,3 being higher than that of 2,3-dimethyl butadiene-1,3 and the proportion of acrylonitrile being from 25 to 45% by weight.

4. The process which comprises polymerizing in the form of an aqueous emulsion a mixture containing from 35 to 65% by weight of butadiene-1,3, from 10 to 40% by weight of 2,3-dimethyl butadiene-1,3 and about 25% by weight of acrylonitrile.

5. The process which comprises polymerizing in the form of an aqueous emulsion a mixture containing from 30 to 45% by weight of butadiene-1,3, from 10 to 25% by weight of 2,3-dimethyl butadiene-1,3 and about 45% by weight of acrylonitrile.

6. The process which comprises polymerizing in the form of an aqueous emulsion a mixture containing about 60% by weight of butadiene-1,3, about 15% by weight of 2,3-dimethyl butadiene-1,3 and about 25% by weight of acrylonitrile.

7. A synthetic rubber prepared by the method of claim 1.

8. A synthetic rubber prepared by the method of claim 2.

9. A synthetic rubber prepared by the method of claim 3.

10. A synthetic rubber prepared by the method of claim 4.

11. A synthetic rubber prepared by the method of claim 5.

12. A synthetic rubber prepared by the method of claim 6.

CHARLES F. FRYLING.